United States Patent [19]

Beall, Jr.

[11] Patent Number: 5,785,168
[45] Date of Patent: Jul. 28, 1998

[54] HIGH LOAD OVERHEAD CONVEYOR DRIVE SYSTEM

[75] Inventor: Thomas E. Beall, Jr., Arlington, Va.

[73] Assignee: OCS-IntelliTrak, Inc., Cincinnati, Ohio

[21] Appl. No.: 594,086

[22] Filed: Jan. 30, 1996

[51] Int. Cl.$^6$ ................................................. B65G 29/00
[52] U.S. Cl. ........................ 198/465.4; 198/678.1; 104/166
[58] Field of Search ...................... 198/465.1, 465.4, 198/678.1, 685, 686, 687.1; 104/166

[56] References Cited

U.S. PATENT DOCUMENTS

| | | | |
|---|---|---|---|
| 3,164,104 | 1/1965 | Hunt | 104/166 |
| 3,850,280 | 11/1974 | Ohrnell | 198/687.1 |
| 4,203,511 | 5/1980 | Uhing | 198/465.4 X |

FOREIGN PATENT DOCUMENTS 0714323  7/1965  Canada ...................... 104/166

Primary Examiner—James R. Bidwell
Attorney, Agent, or Firm—Fay, Sharpe, Beall, Fagan, Minnich & McKee

[57] ABSTRACT

A load of an overhead conveyor is connected to a carriage, that has elastomeric material biasing a plurality of pivotally mounted driven wheels against a rotatable drive shaft extending along the transporting direction. The driven wheels are canted with respect to the drive shaft so that when the drive shaft is rotated, a helical loci of engagement between the drive shaft and driven wheels provides sufficient traction through the engagement force of the bias to propel the hanger along the transporting path. A first portion of weight of the load is carried through the bias member and through the driven wheels to the drive shaft, and thereafter a next portion of weight of the load is carried through a support wheel to a load support structure independently of the drive shaft. Preferably, the drive shaft is composed of a number of drivingly discontinuous sections that are aligned or alignable for diverting transporting paths so as to each be driven by a separate set of a drive motor, mechanical transmission and drive belt. The drive shaft may include curved sections so that the transporting path may take on any desired shape. The drive shaft is mounted by a plurality of bearings within a channel.

20 Claims, 1 Drawing Sheet

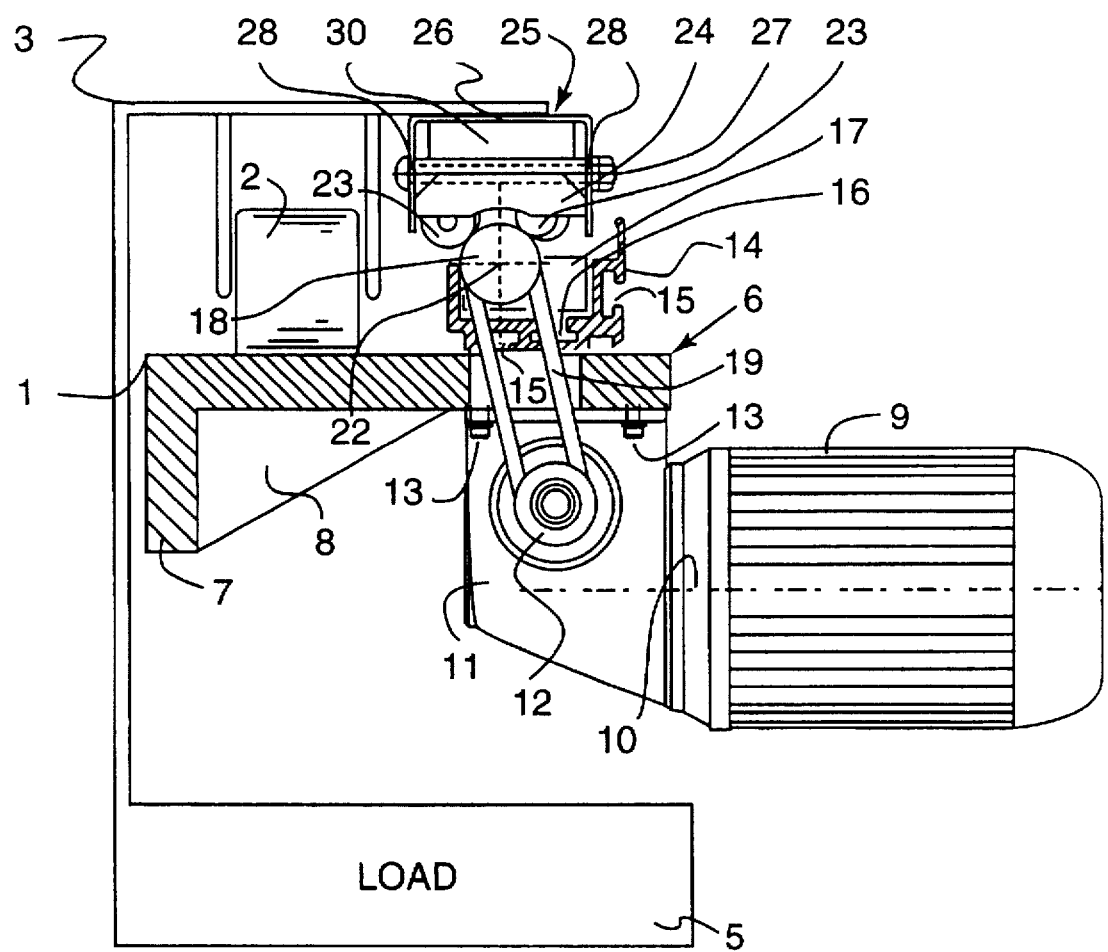

HIGH LOAD OVERHEAD CONVEYOR DRIVE SYSTEM

BACKGROUND OF THE INVENTION

The present invention relates to an overhead conveyor system, more specifically to a rotatable drive shaft overhead conveyor of such a system, wherein the load to be conveyed is suspended from a driven element that engages and thereby is driven along the drive shaft, with weight of the load being transferred from such driven element to the drive shaft for support thereby.

Conventional rotating shaft driven overhead conveyors are limited in the amount of weight they may carry, because the entire weight of the load is supported by the rotating shaft, with the load limit being determined by allowable bending of the shaft, allowable radial load upon shaft bearings, allowable load upon shaft engaging elements, and the like. Therefore, overhead conveyors for relatively large loads are generally of a different type, for example a power and free chain driven conveyor. Shaft driven overhead conveyors have many advantages over the heavier load type conveyors such as the power and free conveyor; such advantages including quietness, cleanliness, less repair, easy diversion of load carrying carriages, buffering, speed variation along the conveying path, and generally greater flexibility in design.

SUMMARY OF THE INVENTION

An overhead conveyor transports a load along a conveying or transporting path that has at least a primary horizontal component. A drive shaft extends along the conveying path and is mounted to a frame for rotation about a shaft axis that is parallel to the conveying path. A support roller is normally spaced above a support surface by a fixed distance when there is no load and is rotatably mounted on a carriage.

One or more driven wheels are rotatably mounted on the carriage for rotation about one or more drive axes, each of which is non-parallel and non-perpendicular to the shaft axis. Each driven wheel engages a top portion of the drive shaft with sufficient traction so as to form a helical loci of engagement about the periphery of the drive shaft during rotation of the drive shaft about the shaft axis to power the carriage along the conveying path in a direction of the conveying path dependent upon a direction of rotation of the drive shaft.

The carriage provides a lost motion connection in a vertical direction. A bias member biases throughout a range of the lost motion connection for providing sufficient engagement traction force between the driven wheel and the drive shaft to power the carriage along the conveying path.

The fixed distance is less than or substantially equal to the range of the lost motion connection so that as the load increases, the range of lost motion connection decreases and the support roller approaches the support surface, until the support roller engages the support surface at a fixed load weight to thereby limit a portion of load weight carried by the drive shaft to the fixed load weight, even when the entire load exceeds the fixed load weight.

BRIEF DESCRIPTION OF THE DRAWING

Further objects, features and advantages of the present invention will become more clear from the following detailed description of a preferred embodiment, shown in the accompanying drawing, wherein:

FIG. 1 is a cross-sectional view along a vertical plane of a high load overhead conveying drive system according to the present invention.

DETAILED DESCRIPTION OF A PREFERRED EMBODIMENT

In a conventional factory it is desirable to move loads along a transporting path (perpendicular to the drawing) that is predominately horizontal, but which may also travel uphill, downhill, divert between subpaths, and the like.

A support rail structure providing a fixed support surface 1 may be independent of or as shown integral with a frame 6 and extends along the conveying path. A support roller 2 is normally spaced above the support surface 1 by a fixed distance when there is no load. The support roller or wheel is rotatably mounted on bearing brackets beneath a first carriage portion 3.

Extending substantially along the entire transporting path, there is the stationary frame 6, which may be attached to the factory ceiling, factory wall, or factory floor, for example. The frame 6, by way of example, comprises an L-shaped steel structural member 7 having a plurality of reinforcing webs 8 at spaced intervals.

A conventional drive motor 9 having a drive shaft (not shown) along axis 10 is mounted on a standard mechanical transmission 11. The transmission 11 has a power input drivingly coupled to the rotational power output of the drive motor, and further has a rotational power output including a belt drive pulley 12. While an electric motor 9 is provided in the preferred embodiment, the drive motor may be hydraulic, pneumatic, or like rotational type power supply, or a linear type motor according to the broader aspects of the present invention. Preferably, the mechanical transmission 11 is a worm gear speed reduction unit, but this mechanical transmission, according to the broader aspects of the invention, may consist of a single shaft coupling if gear reduction is not needed. The motor 9 is connected to the frame 6 by being securely fastened to the side of the mechanical transmission 11, which mechanical transmission is in turn directly connected by means of bolts 13 to the frame 6.

A channel 14 is bolted, for example by means of the same bolts 13, to the frame 6 on the opposite side of the frame 6 from the motor 9 and mechanical transmission 11. The channel 14 is preferably sufficiently rigid for its function, but also bendable along the transporting path, which may be curved. The channel 14 comprises a plurality of aligned and identical cross-sectionally shaped extruded aluminum sections having outwardly facing keyhole shaped slots 15 to provide for mounting of the channel on vertical and horizontal surfaces, as well as inwardly facing keyhole shaped slot 16 for the mounting of a plurality of bearing blocks 17 at spaced locations along the transporting path. The bearing blocks 17, in the cross-sectional view of FIG. 1, do not in any way encumber or overlap the topmost portion of the periphery of a drive shaft 18, which is rotatably supported by the bearing blocks 17 in the channel 14.

The drive shaft 18 is made up of a plurality of drivingly discontinuous sections, with each section being supported by a plurality of bearings within respective bearing blocks 17 and being driven by a separate drive combination of electric motor 9, mechanical transmission 11 and power connection 19, which power connection 19 is a belt extending from the pulley 12 through a suitable aperture within the frame 6 to a drive pulley structure on the section of the drive shaft 18. The power connection 19 may be a standard V-belt, chain, toothed belt, or the like. The pulley structure for the section of the drive shaft has a structure complimentary to the belt, as does the structure of the pulley 12. For that portion of the periphery of the drive shaft 18 that extends above and free of the bearing block 17, the power connection 19, or belt does not extend beyond such peripheral portion and preferably is cylindrically coextensive with the drive shaft 18. The shaft is preferably a hollow, cylindrical aluminum shaft having an outer cylindrical surface, and the curved sections are preferably flexible elastomeric cylindrical shafts of the same diameter with the same cylindrical outer periphery or interdigitated segments (not shown), for example.

To convert the rotary driven motion of the shaft 18, which shaft has a shaft axis 22 extending along the transporting direction, into a linear motion along the direction of the transporting path, at least one or two and most preferably four driven wheels 23 engage the topmost periphery or free periphery of the shaft 18. Each of these driven wheels 23 is mounted for rotation about a driven wheel axis that is non-parallel to the drive shaft axis 22 and non-perpendicular to the drive shaft axis 22, preferably being at an acute angle thereto; the angle being selected according to desired linear speed and linear force along the conveying path. The driven wheels 23 are divided into two sets, with each set having their axes of rotation being within a non-vertical, non-horizontal plane that is parallel (tangent) to the drive shaft axis 22, with the planes intersecting each other. Thereby, when the drive shaft 18 rotates, the driven wheels 23 engage the drive shaft 18 to form a helical loci of engagement about the periphery of the drive shaft 18 so as to linearly power the driven wheels 23 along the transporting path in a direction of the transporting path that depends upon the direction of rotation of the drive shaft 18, in a manner analogous to a worm gear or threaded-type engagement. In fact, according to broader aspects of the present invention, the drive shaft may be a worm gear or threaded shaft and the driven wheels may be a fixed driven element or driven wheels that extend within or interengage with the worm gear or the threaded shaft.

The driven wheels 23 are rotatably mounted on a second carriage portion 24, which is preferably a formed sheet metal channel of U-shape (as seen in an elevational view on a plane perpendicular to the drawing). A drive connector 25 comprises a U-shaped formed sheet metal piece 26 (U-shaped as viewed in the plane of FIG. 1), which as shown overlaps the opposed ends of the second carriage portion 24. The drive connector 25 includes a bolt 27 secured in some suitable manner, for example by welding, to the second carriage portion 24 and extending through suitable vertically elongated holes 28 within the sheet metal piece 26 to have a head at its lower end and a washer and nut at its upper end. The U-shaped formed sheet metal piece 26 is rigidly connected to the first carriage portion 3 suspending the load 5, for example by welding or bolting, and the holes 28 therein receiving the bolt 27 are elongated in the vertical direction towards the load 5, to thereby provide a horizontally driving connection between the first carriage portion 3 and the second carriage portion 24 in the direction of the transporting path (perpendicular to the plane of FIG. 1) and providing a vertical lost motion connection in the carriage in a lost motion vertical direction perpendicular to the drive shaft axis 22. A bias mechanism, for example member 30, which may be a coil spring or leaf spring (not shown) but is preferably an elastomeric compressible material such as foam rubber, extends between the U-shaped formed sheet metal piece 26 and the carriage portion 24 that mounts the driven wheels 23, for biasing the driven wheels 23 into engagement with the drive shaft 18 throughout a range of the lost motion connection and in a bias direction perpendicular to the shaft axis 22 for providing sufficient engagement traction force between the driven wheels 23 and the drive shaft 18 to power the carriage along the transporting path. The bolt 27 provides a pivotal connection about a horizontal pivot axis, to accommodate irregularities in engagement between the driven wheels 23 and the drive shaft 18 along the transporting path.

A first portion of weight of the load 5 and carriage portion 3 is carried by the sheet metal piece 26 through the bias member 30, through carriage portion 24, through the driven wheels 23 to the drive shaft 18, and thereafter a next portion of weight of the load 5 and carriage portion 3 is carried through support wheel 2 to load support structure 1 independently of the carriage portion 24 and drive shaft 18. More generally the carriage as a broader term may include the bolt 27, carriage portions 3, 24, 26, bias member 30 and driven wheels 23, and may carry automatically readable address coding (not shown).

While the preferred embodiment has been shown and described in detail, the description thereof has included structural variations according to the broader aspects of the present invention. Additional structural variations include: that the power connection 19 be a chain, flexible coupling, rigid coupling, or clutch; that the drive connector 25 may be separate from or attached to the carriage portion 3 or a rigid part thereof, for example as described specifically; that the support surface specifically described as the frame 6 may be one or more rails, a roadway, a trackway, or an overhead support surface, in whole or in part; that the bias member 30, in addition to being the mentioned elastomeric material or coil, or leaf spring, may be provided by a compressible gas piston cylinder arrangement, or a gravity arrangement wherein a portion of the weight of the load provides a gravity bias between the drive shaft 18 and driven wheels 23.

While a preferred embodiment of the present invention has been described in detail, with variations and modifications, further embodiments, variations and modifications are contemplated within the broader aspects of the present invention, in addition to the advantageous details, in accordance with the spirit and scope of the following claims.

I claim:

1. An overhead conveyor system, for transporting at least one load along a conveying path that has at least a primary horizontal component, comprising:

a stationary frame extending along the conveying path;

a drive motor mounted to said frame and having a rotational power output;

a mechanical transmission having a power input connected to said rotational power output of said drive motor and further having a rotational power output;

a drive shaft extending along the conveying path and mounting to said frame for rotation about a shaft axis that is parallel to the conveying path;

a power connection between said rotational power output of said mechanical transmission and said drive shaft for rotatably driving said drive shaft about said shaft axis;

a carriage having a first part for driving said carriage and a second part for carrying the load;

a support surface fixed with respect to said frame and extending along the conveying path;

a support roller normally spaced above said support surface by a fixed distance when there is no load and being rotatably mounted on said second part of said carriage about an axis transverse to said shaft axis;

at least one driven wheel rotatably mounted on said first part of said carriage for rotation about a drive axis, said drive axis being non-parallel and non-perpendicular to said shaft axis, and said driven wheel engaging a top portion of said drive shaft with sufficient traction so as to form a helical loci of engagement about the periphery of said drive shaft during rotation of said drive shaft about said shaft axis to power said carriage along the conveying path in a direction of the conveying path dependent upon a direction of rotation of said drive shaft;

said carriage first part and second part being drivingly connected to each other in the direction of the conveying path and providing a lost motion connection between each other in a vertical direction;

a bias mechanism biasing said first part and said second part vertically away from each other throughout a range of said lost motion connection for providing sufficient engagement traction force between said driven wheel and said drive shaft to power the carriage along the conveying path; and said fixed distance being less than or substantially equal to said range of said lost motion connection so that as the load increases from the no load, said range of said lost motion connection decreases and said support roller approaches said support surface, until said support roller engages said support surface at a fixed load weight to thereby limit a portion of load weight carried by said drive shaft to said fixed load weight even when the load exceeds the fixed load weight.

2. A system according to claim 1, wherein said mechanical transmission is a worm gear transmission directly connected to said frame between said frame and said drive motor.

3. A system according to claim 1, wherein the mounting of said drive shaft to said frame includes: a rigid channel extending along the conveying path and being connected to said frame, and a plurality of bearings mounted in said rigid channel for rotatably supporting said drive shaft.

4. A system according to claim 1, wherein said bias mechanism is an elastomeric compressible material.

5. A system according to claim 1, wherein said carriage includes a pivotal connection between said first part and second part about a pivot axis perpendicular to said shaft axis.

6. A system according to claim 1, wherein said drive motor is an electric motor and wherein said power connection is a belt drive.

7. A system according to claim 1, wherein said carriage second part includes means for suspending the load vertically below said support surface and said drive shaft.

8. A system according to claim 1, wherein the support surface is a surface of said frame.

9. A system according to claim 1, wherein said drive shaft is cylindrical with a cylindrical periphery.

10. A system according to claim 9, wherein the mounting of said drive shaft to said frame includes: a rigid channel extending along the conveying path and being connected to said frame, and a plurality of bearings mounted in said rigid channel for rotatably supporting said drive shaft; and wherein said carriage second part includes means for suspending the load vertically below said support surface and said drive shaft.

11. A system according to claim 7, wherein the mounting of said drive shaft to said frame includes: a rigid channel extending along the conveying path and being connected to said frame, and a plurality of bearings mounted in said rigid channel for rotatably supporting said drive shaft.

12. A system according to claim 10, wherein said carriage includes a pivotal connection between said first part and second part about a pivot axis perpendicular to said shaft axis.

13. A system according to claim 11, wherein said carriage includes a pivotal connection between said first part and second part about a pivot axis perpendicular to said shaft axis.

14. A system according to claim 13, wherein said support surface is a surface of said frame; and wherein said drive shaft is cylindrical with a cylindrical periphery.

15. A system according to claim 11, wherein said support surface is a surface of said frame; and wherein said drive shaft is cylindrical with a cylindrical periphery.

16. An overhead conveyor system, for transporting at least one load along a conveying path that has at least a primary horizontal component, comprising:

a stationary frame extending along the conveying path;

a drive motor mounted to said frame and having a rotational power output;

a mechanical transmission having a power input connected to said rotational power output of said drive motor and further having a rotational power output;

a drive shaft extending along the conveying path and mounting to said frame for rotation about a shaft axis that is parallel to the conveying path;

a power connection between said rotational power output of said mechanical transmission and said drive shaft for rotatably driving said drive shaft about said shaft axis;

a carriage having a first part for driving said carriage and a second part for carrying the load;

a support surface fixed with respect to said frame and extending along the conveying path;

a support roller normally spaced above said support surface by a fixed distance when there is no load and being rotatably mounted on said second part of said carriage about an axis transverse to said shaft axis;

at least one driven element mounted on said first part of said carriage, and said driven element and said drive shaft engaging with sufficient traction so as to form a helical loci of engagement about the periphery of said drive shaft during rotation of said drive shaft about said shaft axis to power said carriage along the conveying path in a direction of the conveying path dependent upon a direction of rotation of said drive shaft;

said carriage first part and second part being drivingly connected to each other in the direction of the conveying path and providing a lost motion connection between each other in a vertical direction;

a bias mechanism biasing said first part and said second part vertically away from each other throughout a range of said lost motion connection for providing sufficient engagement traction force between said driven element and said drive shaft to power the carriage along the conveying path; and said fixed distance being less than or substantially equal to said range of said lost motion connection so that as the load increases from the no load, said range of lost motion connection decreases and said support roller approaches said support surface until said support roller engages said support surface at a fixed load weight to thereby limit a portion of load weight carried by said drive shaft to said fixed load weight even when the load exceeds the fixed load weight.

17. A system according to claim 16, wherein the mounting of said drive shaft to said frame includes: a rigid channel extending along the conveying path and being connected to said frame, and a plurality of bearings mounted in said rigid channel for rotatably supporting said drive shaft;

wherein the support surface is a surface of said frame;

wherein said carriage second part includes means for suspending the load vertically below said support surface and said drive shaft; and wherein said carriage includes a pivotal connection between said first part and second part about a pivot axis perpendicular to said shaft axis.

18. A conveyor system for carrying a load along a conveying path, comprising the following elements:

a load support structure extending along the conveying path;

a drive motor having a rotational power output;

a cylindrical drive shaft extending along the conveying path, mounting for rotation about a shaft axis, and drivingly connecting to said drive motor;

a first carriage portion and a second carriage portion, drivingly interconnected in a direction of the conveying path and providing a lost motion connection therebetween perpendicular to the conveying path; and a bias mechanism mounted between said first carriage portion and said second carriage portion biasing said first carriage portion and said second carriage portion in one bias direction relative to each other throughout a range of said lost motion connection;

a plurality of driven wheels rotatably mounted about a plurality of driven wheel axes on said first carriage portion, with said driven wheel axes being non-parallel to said drive shaft axis and each other, and said driven wheels engaging said drive shaft at positions spaced from each other about a top periphery of said drive shaft so that rotation of said drive shaft about said shaft axis will power said first carriage portion and thereby said second carriage portion along the conveying path in a direction dependent upon direction of rotation of said drive shaft to define a helical loci of engagement about the periphery of said drive shaft;

said second carriage portion having a support wheel vertically spaced above said load support structure by a substantial amount less than or substantially equal to and parallel to said range of lost motion;

said second carriage portion supporting a weight of the load; and said elements being so positioned, arranged and constructed that a first portion of weight of the load is carried by said second carriage portion through said bias mechanism, through said first carriage portion, through said plurality of driven wheels and to said drive shaft, and thereafter a next portion of weight of the load is carried by said second carriage portion through said support wheel to said load support structure independently of said first carriage portion, said driven wheels and said drive shaft.

19. A system according to claim 18, wherein the mounting of said drive shaft includes a rigid channel extending along said conveying path and a plurality of bearings mounted in said channel for rotatably supporting said drive shaft .

20. A system according to claim 19, including a pivotal connection between said first carriage portion and said second carriage portion about a pivot axis perpendicular to said shaft axis.

* * * * *